US009357213B2

(12) United States Patent  (10) Patent No.: US 9,357,213 B2
Mohsenian  (45) Date of Patent: May 31, 2016

(54) HIGH-DENSITY QUALITY-ADAPTIVE MULTI-RATE TRANSCODER SYSTEMS AND METHODS

(71) Applicant: IMAGINE COMMUNICATIONS CORP., Frisco, TX (US)

(72) Inventor: Nader Mohsenian, San Jose, CA (US)

(73) Assignee: Imagine Communications Corp., Frisco, TX (US)

( * ) Notice: Subject to any disclaimer, the term of this patent is extended or adjusted under 35 U.S.C. 154(b) by 684 days.

(21) Appl. No.: 13/711,758

(22) Filed: Dec. 12, 2012

(65) Prior Publication Data

US 2014/0161174 A1  Jun. 12, 2014

(51) Int. Cl.
*H04N 19/30* (2014.01)
*H04N 19/40* (2014.01)

(52) U.S. Cl.
CPC ......... *H04N 19/00472* (2013.01); *H04N 19/30* (2014.11); *H04N 19/40* (2014.11)

(58) Field of Classification Search
CPC . H04N 7/50; H04N 7/26244; H04N 7/26271; H04N 7/26053; H04N 7/26941; H04N 19/40; H04N 19/00224; H04N 19/00472; H04N 19/00521; H04N 19/00533; H04N 19/00569; H04N 19/00763; H04N 19/00896; H04N 19/16; H04N 19/436; H04N 19/44; H04N 19/50; H04N 19/593
See application file for complete search history.

(56) References Cited

U.S. PATENT DOCUMENTS

| | | | | |
|---|---|---|---|---|
| 6,401,132 B1 * | 6/2002 | Bellwood | ............ | H04L 67/2823 709/201 |
| 6,490,320 B1 * | 12/2002 | Vetro | ............ | H04L 29/06 375/240.08 |
| 6,493,386 B1 * | 12/2002 | Vetro et al. | ............ | 375/240.1 |
| 8,767,838 B1 * | 7/2014 | Xin | ............ | H04N 19/00472 375/240.26 |
| 2003/0174770 A1 * | 9/2003 | Kato | ............ | H04N 19/503 375/240.2 |

(Continued)

OTHER PUBLICATIONS

B. Bross, et al., "High efficiency video coding (HEVC) text specification draft 8", Joint Collaborative Team on Video Coding (JCT-VC) of ITU-T SG16 WP3 and ISO/IEC JTC1/SC29/WG11, 10th Meeting: Stockholm, SE, Jul. 11-20, 2012, 73 pages.

(Continued)

*Primary Examiner* — Kate Luo
*Assistant Examiner* — Howard D Brown, Jr.
(74) *Attorney, Agent, or Firm* — Tarolli, Sundheim, Covell & Tummino LLP

(57) ABSTRACT

The present invention provides methods and systems that create numerous high-quality output streams at different spatial or temporal resolutions from a single input stream. An input stream is transcoded at a first transcoder module to provide N output streams, wherein each of the N output streams comprises different versions of the input stream. Parameters are obtained during transcoding of the input stream and provided to a second transcoder module together with the input stream. The input stream may be transcoded at the second transcoder module to produce M output streams based on the parameters received from the first transcoder module. The parameters received from the first transcoder module may be used to enhance the transcoding at the second transcoder module.

36 Claims, 9 Drawing Sheets

(56) References Cited

U.S. PATENT DOCUMENTS

| | | | |
|---|---|---|---|
| 2005/0008074 A1* | 1/2005 | van Beek | H04N 21/2365 375/240.01 |
| 2006/0088105 A1* | 4/2006 | Shen | H04N 19/197 375/240.21 |
| 2007/0030903 A1* | 2/2007 | Cote et al. | 375/240.16 |
| 2007/0030904 A1* | 2/2007 | Winger | H04N 19/00472 375/240.16 |
| 2007/0030905 A1* | 2/2007 | Cote | 375/240.16 |
| 2007/0146542 A1* | 6/2007 | Strasser | 348/462 |
| 2007/0177677 A1* | 8/2007 | Thomsen | 375/240.26 |
| 2010/0008421 A1* | 1/2010 | Gutman et al. | 375/240.16 |
| 2011/0216785 A1* | 9/2011 | Begen et al. | 370/477 |
| 2012/0155553 A1* | 6/2012 | Liao | H04N 21/6125 375/240.26 |
| 2012/0275516 A1* | 11/2012 | Tanaka | H04N 19/50 375/240.12 |
| 2014/0337903 A1* | 11/2014 | Zhu | H04N 21/6587 725/90 |

OTHER PUBLICATIONS

"Information technology—Generic coding of moving pictures and associated audio information: Video", International Standard, ISO/IEC 13818-2, Second Edition, Dec. 15, 2000, 220 pages.

"Advanced video coding for generic audiovisual services", ITU-T, Telecommunication Standardization Sector of ITU, H.264, Series H: Audiovisual and Multimedia Systems, Infrastructure of audiovisual services—Coding of moving video, Mar. 2005, 343 pages.

* cited by examiner

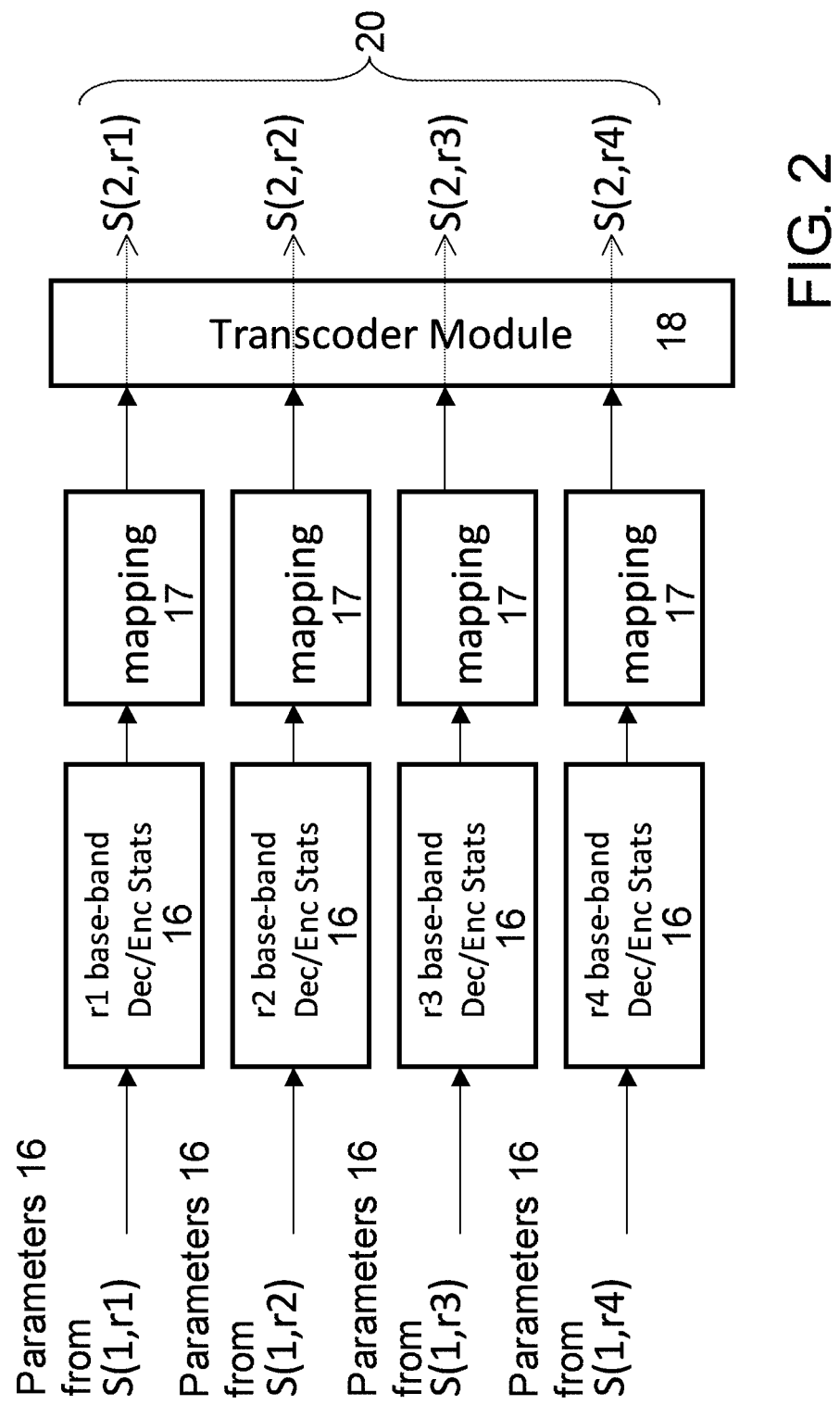

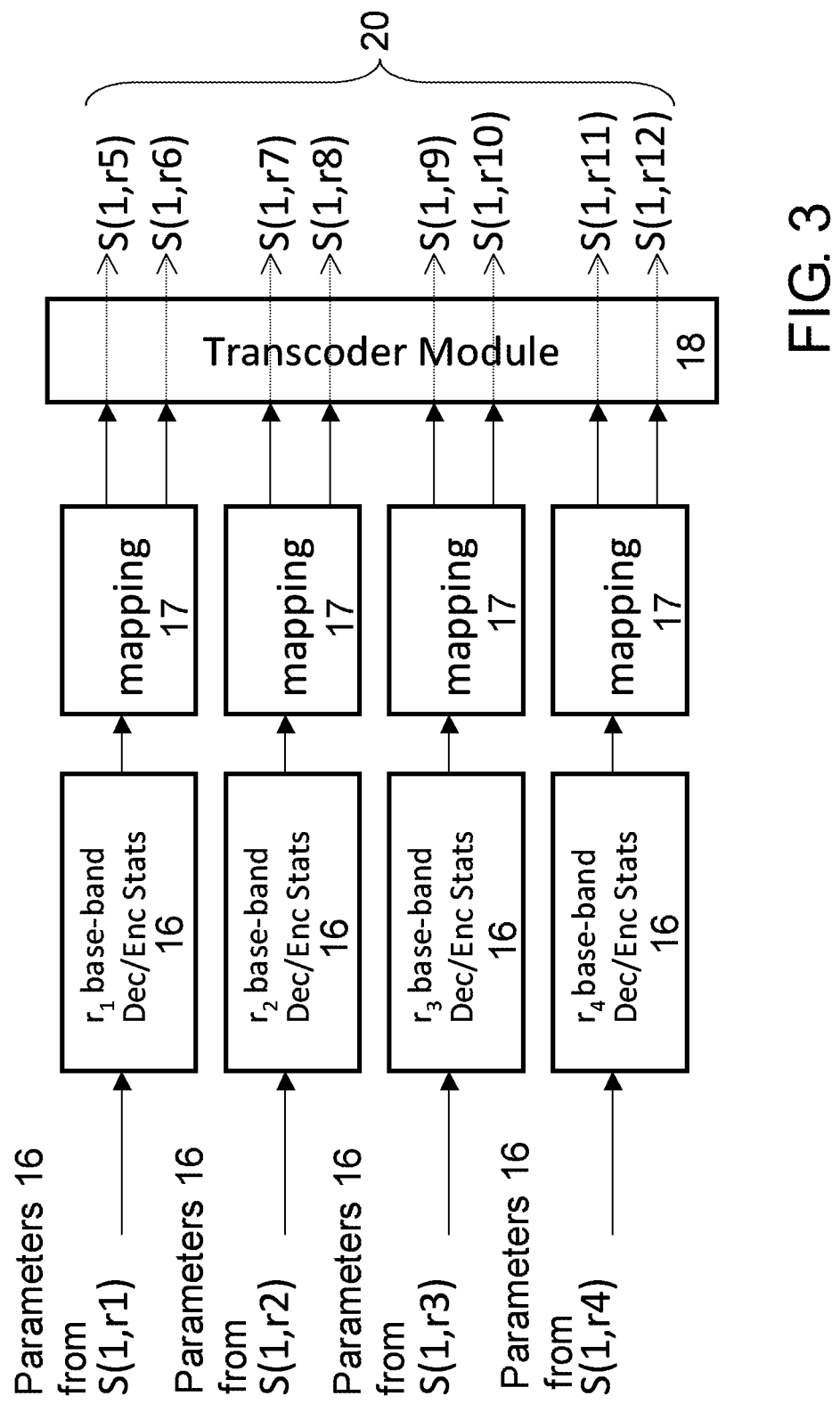

HIGH-DENSITY QUALITY-ADAPTIVE MULTI-RATE TRANSCODER SYSTEMS AND METHODS

BACKGROUND OF THE INVENTION

The present invention relates to the field of digital video transcoders. More specifically, the present invention relates to transcoder systems and methods that create numerous high-quality output streams at different spatial or temporal resolutions from a single input stream.

With the widespread use of sophisticated video compression standards, such as AVC/H.264 (MPEG-4 part 10) and MPEG-2, and soon to be completed HEVC/H.265, for digital broadcast and video streaming, it is desirable to make the aforementioned standards interoperable. Further, recent advances in consumer electronics have provided a multitude of cost effective monitors, from high-end SHDTV/HDTV to computer displays to medium or small screen portable devices. With so many available display devices and multiple formats to support, there is need to design and develop high-density transcoding platforms capable of re-compressing input streams to many outgoing streams to accommodate the multiple formats and display devices. It is also desirable to deliver every single output stream at an acceptable video quality.

Accordingly, it would be advantageous to provide acceptable video quality in a high-density transcoding platform. In particular, it would be advantageous to provide methods and systems for transcoding a single input stream into multiple output streams having different resolutions and formats, enabling compatibility with various types of devices and displays, as well as various content delivery formats and systems.

The methods and systems of the present invention provide the foregoing and other advantages.

SUMMARY OF THE INVENTION

The present invention relates to the field of digital video transcoders. More specifically, the present invention relates to transcoder systems and methods that create numerous high-quality output streams at different spatial or temporal resolutions from a single input stream.

In accordance with one example embodiment of a method for transcoding video streams in accordance with the present invention, the method may comprise transcoding an input stream at a first transcoder module to provide N output streams, wherein each of the N output streams comprises different versions of the input stream. Parameters are obtained during transcoding of the input stream and provided to a second transcoder module together with the input stream. The input stream may be transcoded at the second transcoder module to produce M output streams based on the parameters received from the first transcoder module. The parameters received from the first transcoder module may be used to enhance the transcoding at the second transcoder module.

The transcoding of the input stream at the first transcoder module may further comprise at least partially decoding the input stream at the first transcoder module. The input stream may be stored in a stream buffer and/or the at least partially decoded input stream may be stored in a frame buffer. The parameters may be stored in a memory.

The parameters may be provided by extracting statistical parameters during at least partial decoding of the input stream.

Transcoding the input stream at the first transcoder module may further comprise re-encoding the at least partially decoded input stream to produce the N output streams. Each of the N output streams may be obtained by re-encoding the input stream at one or more different resolutions and/or in one or more different encoding formats.

The parameters may comprise statistical parameters obtained during the at least partial decoding or the re-encoding of the input stream. Further, the parameters may be obtained from at least one of the input stream, the at least partially decoded input stream, and the N output streams.

The N output streams may be in a compressed domain.

The parameters may comprise respective parameters for each of the N output streams. The parameters may comprise at least one of picture bits, picture quantization factors, motion information, mode decision histograms, spatial activities, temporal activities, resolution histograms, picture distortion, picture type frequencies, structural similarities, grey-level histograms, picture sample dynamic range, and the like.

A first subset of the M output streams may have identical transcoding attributes as a corresponding subset of the N output streams. A second subset of the M output streams may have different transcoding attributes from any of the N output streams. The transcoding attributes may comprise at least one of resolution, bit-rate, frame-rate, stream format, picture type assignment, and the like.

The parameters may be mapped from any one of the N output streams for use in producing a desired one of the M output streams. Mapping of the parameters may comprise correlating a plurality of macroblock resolutions of the one N output stream to the desired M output stream. The correlating of the macroblock resolutions may further comprise comparing a ratio of a number of macroblocks between the one N output stream and the desired M output stream.

Desired M output streams may be grouped into two or more groups by correlating a macroblock resolution of a selected group member of each group of the desired M output streams with a closest macroblock resolution of at least one of the N output streams. The at least one N output stream may comprise at least one seed stream for the corresponding group of M output streams. The at least one seed stream, base-band statistics from a decoded version of at least one seed stream, or the parameters from the at least one seed stream may be provided to the second transcoder module for use in producing the M output streams of the corresponding group.

Sub-groups may be created in each group of M output streams by correlating a number of bits per macroblock from the desired M output streams with a number of bits per macroblock from the N output streams.

An optimum N output stream for use as a seed stream may be determined from the N output streams by correlating a number of bits per macroblock of the selected group member and a number of bits per macroblock of each of the N output streams. At least one of the seed stream, base-band statistics from a decoded version of the seed stream, or the parameters from the seed stream may be provided to the second transcoder module for use in producing the M output streams of the corresponding group.

For each of the N output streams that does not meet minimum criteria during the correlating, at least one of each such N output stream, base-band statistics from a decoded version of each such N output stream, or parameters from each such N output stream may be provided to the second transcoder module for producing an enhanced version of each of such N output streams as a corresponding one of the M output streams.

At least one of the N output streams may be provided to the second transcoder module to produce enhanced versions of the at least one N output streams as a corresponding at least one of the M output streams.

A correlation condition may be determined between the N output streams and the desired M output streams. The parameters from the N output streams may be mapped for use in the transcoding of the input stream at the second transcoder module to produce the M output streams based on the determined correlation condition.

In a further example embodiment of the present invention, a method for optimizing video quality in a transcoder system is provided. The method may comprise providing a first set of parallel transcoder modules and a second set of parallel transcoder modules. An identical input stream may be provided to the first set of parallel transcoder modules to provide Y output streams. Parameters from the transcoding of the input stream may be determined. The Y output streams and the parameters may be provided to the second set of parallel transcoder modules to produce X output streams. The parameters received from the first set of parallel transcoder modules may be used to enhance the transcoding at the second set of parallel transcoder modules.

The Y output streams may be partitioned into a plurality of groups based on a correlation of macroblock resolutions of the Y output streams. Each group of the Y output streams and the parameters corresponding to the particular group may be provided to a corresponding transcoder module of the second set of parallel transcoder modules based on a correlation of the macroblock resolutions of the group of the Y output streams and the desired macroblock resolution of the X output streams to be produced by the corresponding transcoder module of the second set of transcoder modules.

The correlation of the macroblock resolutions of the Y output streams for the partitioning may further comprise comparing a ratio of macroblocks of the Y output streams.

A seed stream may be selected from the Y output streams of each group that has a desired resolution. The parameters from the seed stream may be used to enhance the transcoding process at at least one of the transcoder modules of the second set of transcoder modules. The desired resolution may be one of the largest resolution in the group, or a centroid of all resolutions in the group.

Each group may be partitioned into sub-groups based on a correlation of the bits per macroblock for each of Y output streams. A seed stream may be selected from the Y output streams of each sub-group that has a desired resolution. The parameters from the seed stream may be used to enhance the transcoding process at at least one of the transcoder modules of the second set of transcoder modules. The desired resolution may be one of the largest resolution in the sub-group, or a centroid of all resolutions in the sub-group.

It may be determined whether any of the Y output streams is of a lower quality or has a weak macroblock correlation to other of the Y output streams. Any such Y output streams may be transcoded at least two times using a subset of the transcoder modules of the second set of parallel transcoder modules.

The input stream or a seed stream chosen from the Y output streams that has a desired resolution may be transcoded at least two times using a subset of the transcoder modules of the second set of parallel transcoder modules. For example, the seed stream may be transcoded more times than an output stream that is not associated with the target resolution. Further, an output stream that is not associated with the target resolution may be transcoded only once.

Parameters from a first transcoder of the first set of parallel transcoders may be provided to at least one other transcoder of the first set of parallel transcoders for use in enhancing the transcoding of the input stream.

The present invention also includes systems for carrying out the various methods discussed above. In accordance with one example embodiment of a system for transcoding video streams in accordance with the present invention, the system may comprise at least a first transcoder module and a second transcoder module. The first transcoder module may be adapted to transcode an input stream to provide N output streams, wherein each output stream comprises a different version of the input stream. The second transcoder module may be adapted to receive the input stream and parameters obtained during transcoding of the input stream at the first transcoder module. The second transcoder module may also be adapted to transcode the input stream to produce M output streams based on the received parameters.

The system may also include additional features discussed above in connection with the various embodiments of the corresponding methods.

BRIEF DESCRIPTION OF THE DRAWINGS

The present invention will hereinafter be described in conjunction with the appended drawing figures, wherein like reference numerals denote like elements, and:

FIG. 2 shows a block diagram of an example embodiment of a high-quality mode of operation of a transcoder system in accordance with the present invention;

FIG. 3 shows a block diagram of example embodiment of a high density mode of operation of a transcoder system in accordance with the present invention;

DETAILED DESCRIPTION

Figure 1:
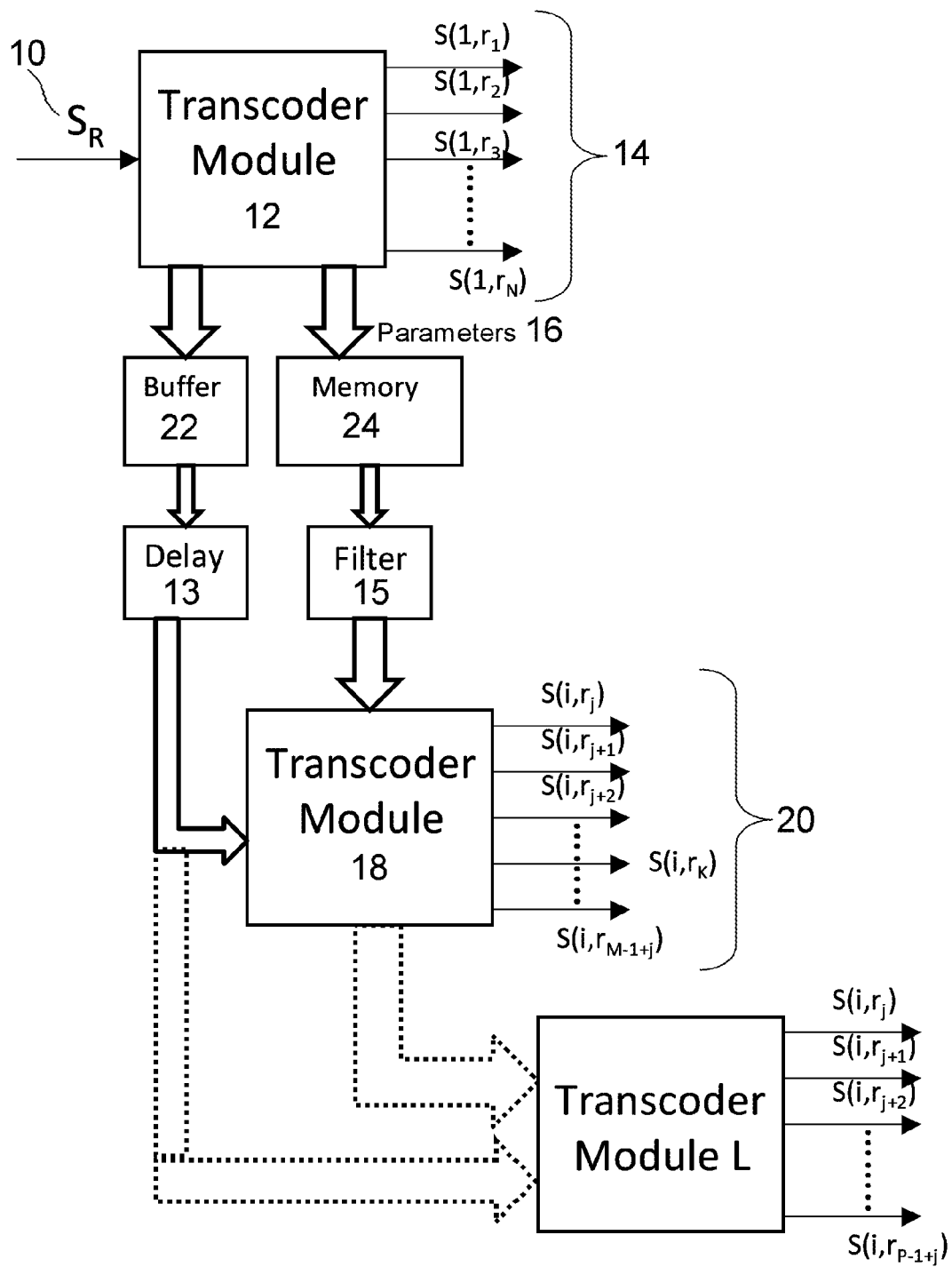
FIG. 1 shows a block diagram of an example embodiment of a system for transcoding video streams in accordance with the present invention.

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims. The present invention relates to the field of digital video transcoders. More specifically, the present invention relates to transcoder systems that create numerous high-quality output streams at different spatial or temporal resolutions from a single input stream, and methods of using the same.

Input to the system may be a compressed transport stream comprised of video, audio, meta data, and any other necessary overhead information needed for broadcasting or transmission of the transport stream. While the invention is directed to video information of the transport stream, those skilled in the art will recognize that non-video information contained in the transport stream may also be processed along with the corresponding video information (e.g., by other dedicated modules in the transcoding system described herein).

One example embodiment of a system for transcoding video streams in accordance with the present invention is shown in FIGS. 1-4. An input stream 10 may be transcoded at a first transcoder module 12 to provide N output streams 14, wherein each of the N output streams comprises different versions of the input stream 10. The N output streams 14 may be represented as $S(i,r_j)$, where "i" is the number of passes the stream has been encoded and "$r_j$" is the resolution of the particular N output stream 14 (for example, the output streams $S(i,r_1), S(i,r_2), S(i,r_3), \ldots S(i,r_N)$). Parameters 16 may be obtained during transcoding of the input stream 10 at the first transcoder module 12 and provided to a second transcoder module 18 together with the input stream 10, which may be stored in a buffer 22, as described further below. The input stream 10 may be transcoded at the second transcoder module 18 to produce M output streams 20 based on the parameters 16 received from the first transcoder module 12. The parameters 16 received from the first transcoder module 12 may be used to enhance the transcoding at the second transcoder module 18.

The M output streams 20 from the second transcoder module 18 may have the same or different resolutions than the corresponding N output streams 14 from the first transcoder module 12. Ultimately quality of a picture is determined by a picture quantizer, which may vary from macroblock to macroblock. During scene changes and higher-order scene transitions, accurate computations of picture quanitzers may become critical. Instead of guessing or using pre-determined fixed parameters, the present invention uses the statistical correlations between outputs of the first and second transcoder modules 12, 18 to compute better metrics for picture bits allocation and picture quantizers. For example, for any given resolution $r_j$ among desired M outputs, the closest resolution from N outputs is determined, and the statistical information (parameters 16) from this closest resolution may be used to calibrate video quality in the M output streams 20 from the second transcoder module 18. A similar strategy may be applied to "L" number of transcoder modules as shown in FIG. 1.

The transcoding of the input stream 10 at the first transcoder module 12 may further comprise at least partially decoding the input stream 10 at the first transcoder module 12. The input stream 10 and/or the at least partially decoded input stream may be stored in the buffer 22. The buffer 22 may comprise a stream buffer for storing the input stream 10 and/or a frame buffer for storing the at least partially decoded input stream. For example, as would be appreciated by those skilled in the art, a separate frame buffer and a separate stream buffer may be provided, or the buffer 22 may be partitioned into stream and frame buffer portions. The output of the buffer 22 (the input stream 10 and/or frames of the at least partially decoded input stream) may be delayed (e.g., at a delay module 13) before being provided to the second transcoder module 18 or additional transcoder modules, for timing purposes. For example, the delay module 13 may allow the first transcoder module 12 to operate sufficiently ahead of the second transcoder module 18 such that parameters 16 from the first transcoder module 12 may be fed to the second transcoder module 18. If, for example, the delay module 13 was not present or was not operational, the same input would be fed to both the first transcoder module 12 and the second transcoder module 18 simultaneously, and the parameters 16 would not be transferred from the first transcoder module 12 to the second transcoder module 18 on time, as they would not be available yet due to processing delays at the first transcoder module 12.

The parameters 16 may be stored in a memory 24. The parameters may be filtered at a filter 15. The filter 15 may transform picture-level statistics, macroblock-level statistics, and base-band statistics to another set of parameters that are more useful for a video encoder of the second transcoder module 18 (e.g., video encoder 60 described in detail below). For example, at filter 15, picture bits may be aggregated over a particular scene, and macroblock-level quantizers may be aggregated over macroblocks in the same scene, and together they may form a complexity metric for a scene which can then be provided to the second transcoder module 18. Further, at filter 15, base-band statistics may be used to form histograms for the same scene to reflect local image structures for use at the second transcoder module 18.

The parameters 16 may be provided by extracting statistical parameters during at least partial decoding of the input stream 10.

Figure 1A:
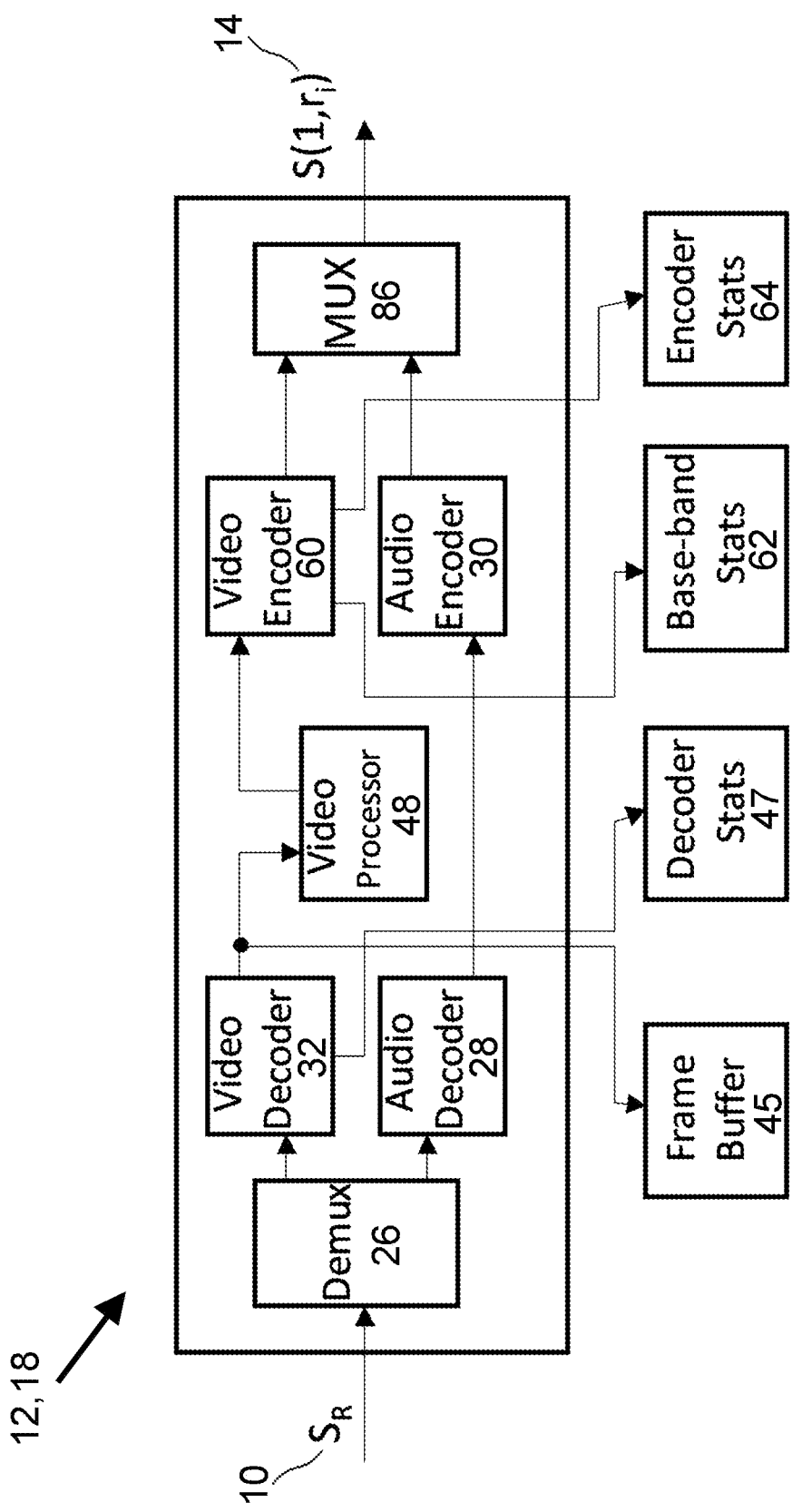
FIG. 1A shows an example embodiment of a block diagram of a transcoder module in accordance with the present invention.

FIG. 1A shows an example embodiment of a block diagram of a transcoder module in accordance with the present invention (e.g., transcoder module 12 or 18 of FIG. 1). As shown in FIG. 1A, the input stream 10 is provided to a demultiplexer 26 of a transcoder module 12, 18. The input stream 10 may be demultiplexed by the demultiplexer 26 to generate compressed video and audio streams. An audio decoder 28 may decode the compressed audio stream. The uncompressed/decoded audio stream may be input to an audio encoder 30 to generate a compressed/encoded audio stream with a different format and audio rate. A video decoder 32 may decode the compressed video stream. The uncompressed "base-band" video stream from the video decoder 32 may be input to a video processor 48 for scaling, deinterlacing, smoothing, video de-blocking, noise reduction, image sharpening, and any other form of video processing. The processed base-band signal from the video processor 48 may be input to, or received by, a video encoder 60 to generate compressed/encoded video stream.

Additionally, the uncompressed/decoded video stream may be sent from the video decoder 32 and input to, and received by, a frame buffer 45. The frame buffer 45 may store a large number of frames, and may be used to feed, or send frames to, another transcoder module.

During the video decoding process at the video decoder 32, decoder statistics 47 may be extracted and stored for further processing by another transcoder module or modules, for example transcoder modules 18 . . . L. A video encoder 60 may analyze the processed base-band signal and store base-band statistics and/or a copy of the base-band stream 62. The base-band statistics 62 may be spatial and temporal activities and histograms from the particular resolution "$r_j$" of the N output stream 14. The resolution "$r_j$" may be defined by a width "W" and a height "H" of the output frame: $r_j=W*H$. Additionally, as the video encoder 60 encodes the video stream, the video encoder 60 may store encoder statistics 64. The decoder statistics 47, base-band statistics 62, and/or encoder statistics 64 (or any combination or subset thereof) may comprise the parameters 16 stored in the memory 24 of FIG. 1.

The compressed/encoded audio and video streams from the audio encoder 30 and the video encoder 60 may be multiplexed together at a multiplexer 86 to provide one of the N output streams 14.

The transcoder module 12, 18 may include multiple transcoding paths for simultaneously producing the N output streams (i.e., N video and audio encoders/decoders, and video processors or corresponding process paths).

Those skilled in the art will appreciate that complete decoding and decompression of the audio and video streams is not necessary, and only decoding to the extent necessary to re-encode at the desired bit rate and format is required.

Figure 1B:
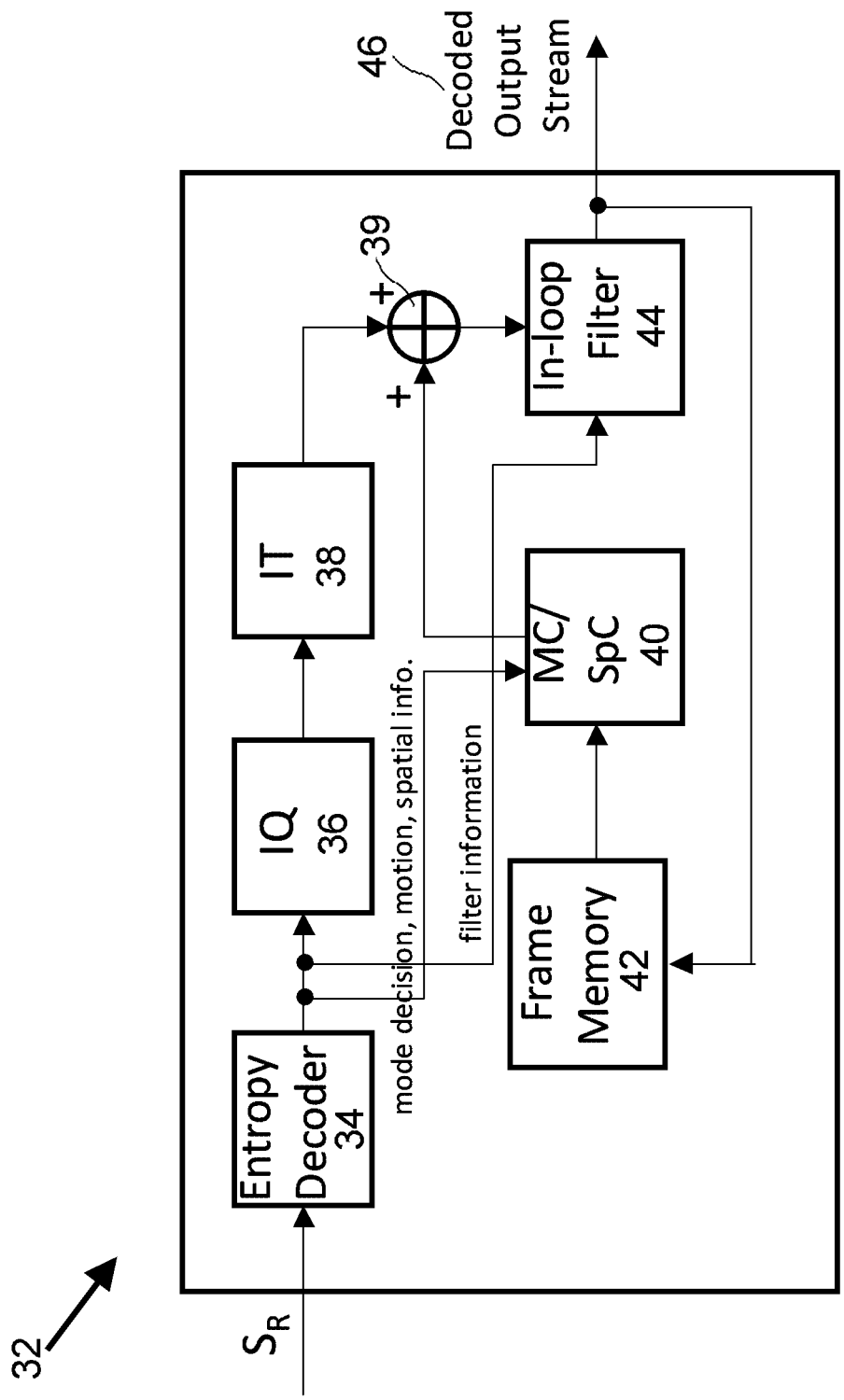
FIG. 1B shows an example embodiment of a block diagram of a video decoder in accordance with the present invention.

FIG. 1B shows an example embodiment of a block diagram of a video decoder 32. In the video decoder 32, the compressed video stream may first be received by an entropy decoder 34. The entropy decoder 34 may decode compressed video stream entropy symbols and provide quantized frequency coefficients, motion information such as motion vectors, mode decisions, and filter information. The quantized frequency coefficients may be input to an inverse quantizer (IQ) 36 to provide inversed quantized coefficients. The inversed quantized coefficients output from the IQ 36 may then be input to an inverse transformer (IT) 38 to provide sample residues of frames. The video decoder 32 may also include a motion compensated or spatially compensated (MC/SpC) block 40 to provide predicted samples of frames. The MC/SpC block 40 may receive the output of the entropy decoder 34 in the form of a mode decision to decide whether to apply motion compensation or spatial compensation. If the decision is to apply motion compensation, samples from another frame are retrieved from a frame memory 42 for the MC/SpC block 40 to perform pixel displacements. If the decision is to apply spatial compensation, previous samples from the current frame being decoded are retrieved from the frame memory 42 to represent predicted pixels. The sample residues from the IT 38 may be added (e.g., at adder 39) to the predicted samples from the MC/SpC block 40 to form frames. The video decoder 32 may also include an In-loop filter 44. The In-loop filter 44 may receive input from the entropy decoder 34 in the form of filter information, which identifies the samples for filtering, and the strength of the filter. The output of the In-loop filter 44 may be stored in the frame memory 42 for future processing. The frames formed from the addition of the sample residues and predicted samples may be input to the In-loop filter 44 to produce filtered frames of decoded (or at least partially decoded) video output stream 46 (also referred to herein as a "base-band stream").

Figure 1C:
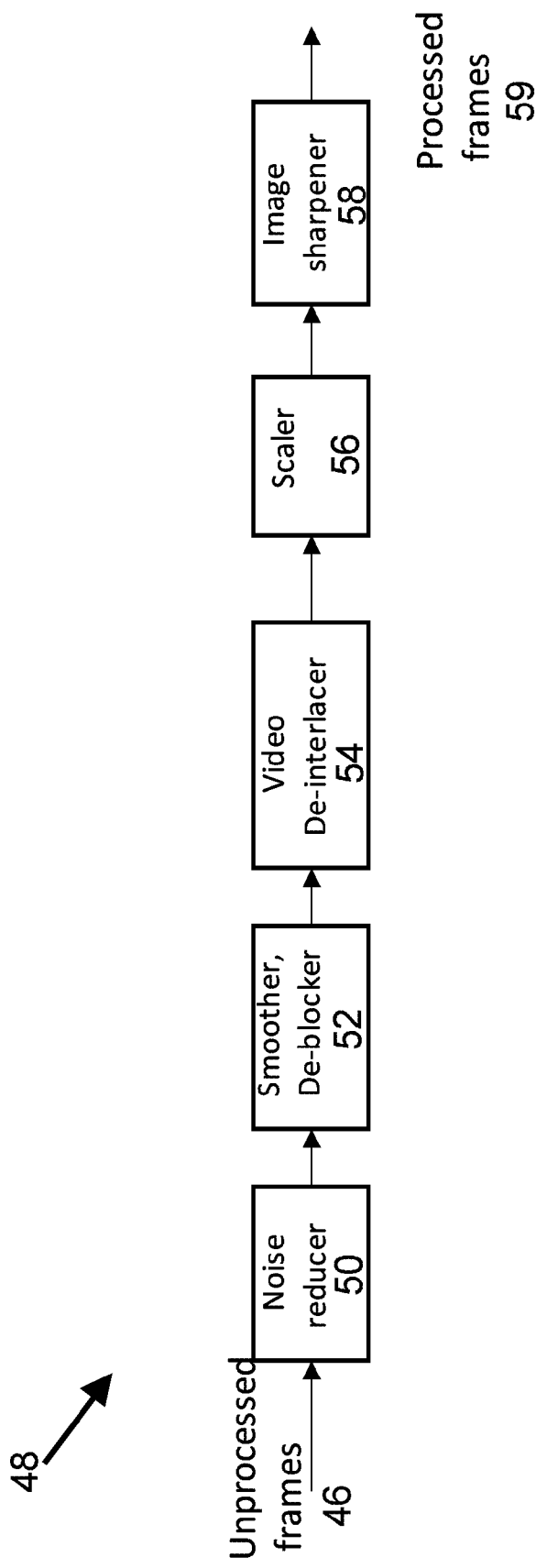
FIG. 1C shows a block diagram of an example embodiment of a video processor in accordance with the present invention.

FIG. 1C shows a block diagram of an example embodiment of a video processor 48. The decoded output stream 46 from the video decoder 32 is provided to the video processor 48. These uncompressed frames may first be fed to a noise reducer 50. The noise reducer 50 may apply liner or nonlinear filters in three dimensions (3D), or 2D or 1D, or any other suitable means, to remove unwanted noise from the video stream. Then, a smoother and deblocker 52 may correct compression artifacts such as mosquito noise, blockiness or contours, ringing effects, and the like. A video de-interlacer 54 may perform a conversion from interlaced fields to progressive frames. The video stream may then be fed to a scaler 56, which may perform image resizing on every picture. An image sharpener 58 may then perform contrast enhancements to sharpen the edges of the source. Processed frames 59 are then output from the video processor 48 and provided to the video encoder 60.

It should be appreciated by those of ordinary skill in the art that the components of the video processor 48 shown in FIG. 1C are exemplary only, and other processing stages may be required and/or certain of the shown processing stages may be omitted, based on the requirements of the system and the desired results.

Transcoding the input stream 10 at the first transcoder module 12 may further comprise re-encoding the at least partially decoded input stream to produce the N output streams 14. Each of the N-output streams 14 may be obtained by re-encoding the input stream 10 at one or more different resolutions and/or in one or more different encoding formats.

Figure 1D:
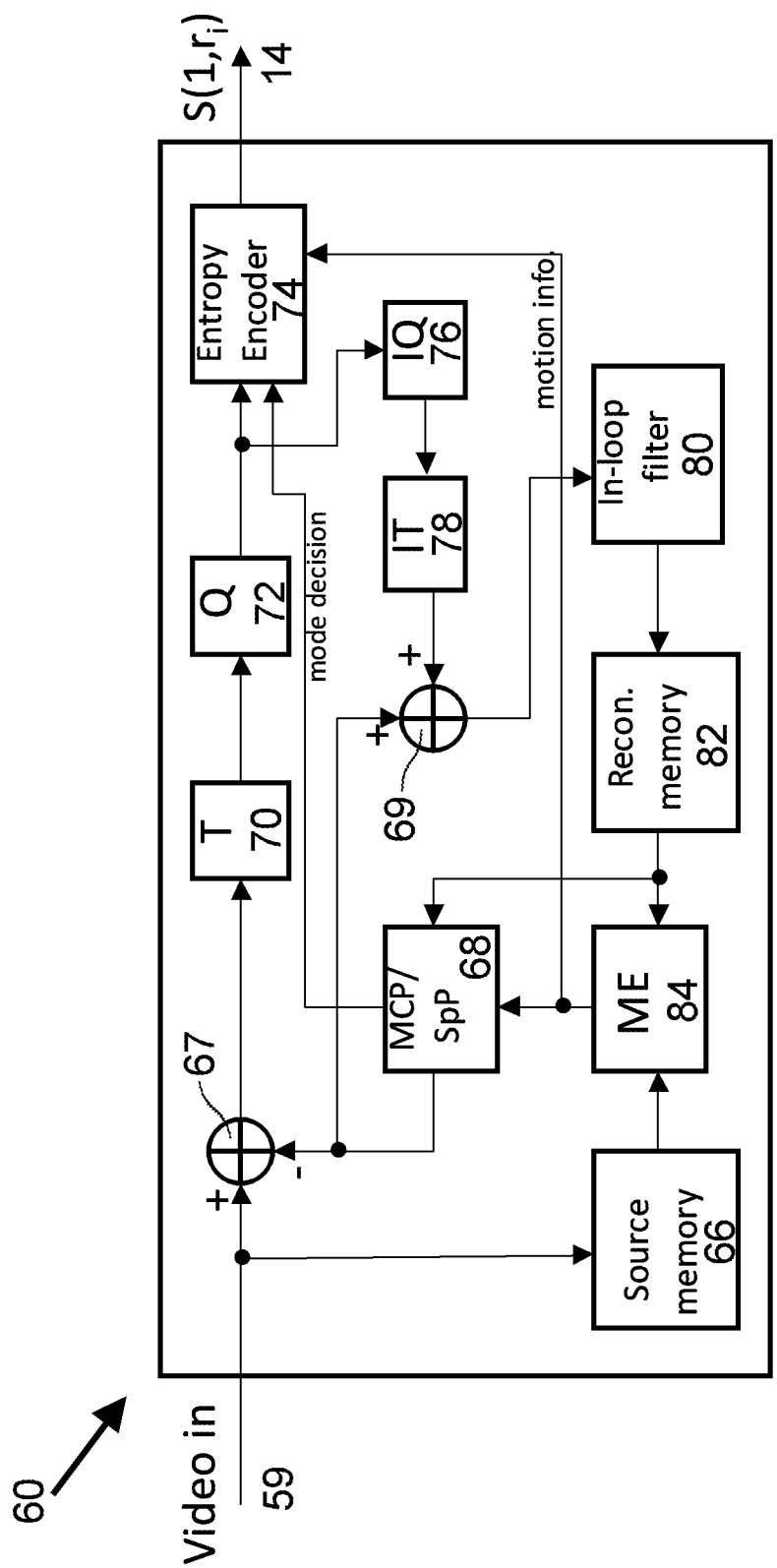
FIG. 1D shows a block diagram of an example embodiment of a video encoder in accordance with the present invention.

FIG. 1D shows a block diagram of an example embodiment of a video encoder 60. The uncompressed processed frames 59 of video are provided from the video processor 48 and stored in a source memory 66 of the video encoder 60. In the video encoder 60, a best prediction from motion compensated prediction (MCP) or spatial prediction (SpP) is chosen at a MCP/SpP block 68, and subtracted from the video frame input (e.g., at adder/subtractor 67). The resulting residual frame is then transformed by a transformer block (T) 70 to the frequency domain, and quantized by a quantizer block (Q) 72, and then fed to an entropy encoder 74 to produce compressed video output stream 14 at a different bit rate and/or in a different format than that of the input stream 10. The output of the Q block 72 may be input to an inverse quantizer (IQ) 76 to produce inversed quantized samples. Output of the IQ 76 may then be input to an inverse transform (IT) 78 to produce samples in a spatial domain. The output samples from the IT 78 may be added (e.g. at adder 69) to output of the MCP/SpP block 68 to form pre-filtered frames. Pre-filtered frames may be filtered by an In-loop filter 80 to produce reconstructed (or decoded) frames. Output frames from the In-loop filter 80 may be stored in a reconstructed memory 82 for future processing. Raw input video frames from the source memory 66 and reconstructed frames from the reconstructed memory 82 may be fed to a motion estimation (ME) engine 84 to search for a best temporal prediction (or match) of the input frames. The best match for the raw input frame from the reconstructed frames may be represented by motion information. Motion information may be input to the entropy encoder 74 to be embedded into the compressed stream. The best match coordinates may be provided from the ME engine 84 for motion compensated prediction (MCP) at the MCP/SpP block 68 to compensate the proper samples in a reconstructed frame from the reconstructed memory 82, and output the predicted frame from the MCP process. The MCP/SpP block 68 has the responsibility of making a mode decision to choose between spatial prediction (SpP), and temporal prediction in the form of motion compensated prediction (MCP). The best mode is transferred in terms of a "mode decision" to be embedded in the compressed stream.

The video encoder may produce the N output stream(s) 14, which may be in a compressed domain.

As discussed above, the parameters 16 may comprise statistical parameters obtained during the at least partial decoding or the re-encoding of the input stream 10. Further, the parameters 16 may be obtained from at least one of the input stream 10, the at least partially decoded input stream 46, and the N output streams 14. For example, as discussed above and shown in FIG. 1A, the parameters 16 may comprise decoder statistics 47 obtained during the decoding or partial decoding of the input stream, base-band statistics 62 obtained from the decoded/decompressed and processed stream, and/or encoder statistics 64 obtained during or after the re-encoding of the base-band decoded stream. It should be appreciated that processing by the video processor 48 may change the base-band stream (output of video decoder 32), and hence the stored base-band statistics 62 may differ from the parameters of the decoded output that is input into video processor 48. It should be appreciated that one or both sets of parameters (those of the output of the video decoder and those from the decoded stream processed by the video processor 48) may be stored as the base-band statistics 62). The parameters 16 may comprise respective parameters for each of the N output streams 14. The parameters 16 may comprise at least one of picture bits, picture quantization factors, motion information, mode decision histograms, spatial activities, temporal activities, resolution histograms, picture distortion, picture type frequencies, structural similarities, grey-level histograms, picture sample dynamic range, and the like.

The parameters 16 may be mapped from any one of N output streams 14 for use in producing a desired one of the M output streams 20. Mapping of the parameters 16 may comprise correlating a plurality of macroblock resolutions of the one N output stream 14 to the desired M output stream 20. The total number of macroblocks (defined by "NMB $(r_j)$") may be computed for each output resolution $r_j$ as follows:

$$NMB(r_j) = (W \times H)/256 \qquad \text{eq. 1.0}$$

The correlating of the macroblock resolutions may further comprise comparing a ratio of a number of macroblocks between the one N output stream 14 and the desired M output stream 20.

A first subset of the M output streams 20 may have identical transcoding attributes as a corresponding subset of the N output streams 14. For example, as shown in FIG. 2, for a high quality mode, the transcoder module 12 may output N=4 streams 14. Each of the streams may have parameters 16 associated therewith (e.g., parameters 16 for each of the N output streams S(1, r1), S(1, r2), S(1, r3), and S(1, r4) with respective resolutions r1, r2, r3, r4). The second transcoder module 18 may be configured to reproduce the same N=4 streams with better quality. In this case, the parameters 16 provided to the second transcoder module may include corresponding base-band statistics 62 and encoder statistics 64 for each of the four N output streams. The parameters may be mapped via a mapping process 17 such that the respective parameters 16 at a particular resolution are used to produce corresponding higher resolution output streams 20 (e.g., output streams S(2, r1), S(2, r2), S(2, r3), and S(2, r4)) at the second transcoder module 18. This is the highest quality mode of operation and 2-passes are used for encoding of each stream resolution $r_j$.

Desired M output streams 20 may be grouped into two or more groups by correlating a macroblock resolution of a selected group member of each group of the desired M output streams with a closest macroblock resolution of at least one of the N output streams 14. The at least one N output stream 14 may comprise at least one seed stream for the corresponding group of M output streams. The at least one seed stream, base-band statistics 62 from a decoded version of at least one seed stream, or the parameters 16 from the at least one seed stream may be provided to the second transcoder module 18 for use in producing the M output streams 20 of the corresponding group.

Sub-groups may be created in each group of M output streams 20 by correlating a number of bits per macroblock from the desired M output streams 20 with a number of bits per macroblock from the N output streams 14.

For example, the M output streams 20 may have different transcoding attributes from any of the N output streams 14. The transcoding attributes may comprise at least one of resolution, bit-rate, frame-rate, stream format, picture type assignment, and the like. For example, in one embodiment, the M and N output streams are produced at different resolutions. In such an example, for each desired M output stream 20, the stream from the N output streams 14 that has the closest total number of image samples (or pixels) to the desired stream M output stream 20 is chosen, and the parameters 16 from this N stream are used to guide the encoding parameters of that particular M output stream at the second transcoder module 18.

FIG. 3 shows a particular example embodiment of a high density mode of operation. It should be appreciated that the term "high-density" as used herein connotes a large number of streams each having a different format or resolution. The transcoder module 12 outputs N=4 streams 14. Each of the streams may have parameters 16 associated therewith (e.g., parameters 16 for each of the N output streams S(1, r1), S(1, r2), S(1, r3), and S(1, r4) with respective resolutions r1, r2, r3, r4). The second transcoder module 18 may be configured to output M=8 streams 20 (e.g., output streams S(1, r5), S(1, r6), S(1, r7), S(1, r8), S(1, r9), S(1, r10), S(1, r11), and S(1, r12)), having resolutions r5, r6, r7, r8, r9, r10, r11, and r12, each different from the set of resolutions r1, r2, r3, r4 of the N output streams 14. Each desired resolution r5, r6, r7, r8, r9, r10, r11, and r12 of the desired output streams 20 of the second transcoder module 18 may be cross-correlated against resolutions r1, r2, r3, and r4 of the corresponding output streams 14 of the first transcoder module 12, to determine the N output stream 14 with the closest match. A mapping process 17 is used to direct the parameters 16 from one of the N output streams to the appropriate M output stream or streams 20 based on the cross-correlation. In this example, the closest matches to stream S(1, r1) may be assigned to output streams S(1,r5) and S(1,r6). Therefore, parameters 16 (e.g., base-band statistics 62 and encoder statistics 64 from S(1, r1)) may be used to encode the input stream at the second transcoder module 18 to produce output streams S(1, r5) and S(1, r6) at the desired resolutions r5 and r6. Similarly, the base-band statistics 62 and encoder statistics 64 from stream S(1, r4) may be used to encode the input stream to provide output streams S(1, r11) and S(1, r12) at the desired resolutions r11 and r12. In such an example embodiment, high density may be achieved by processing a maximum number of output streams in a single-pass mode.

Figure 4:
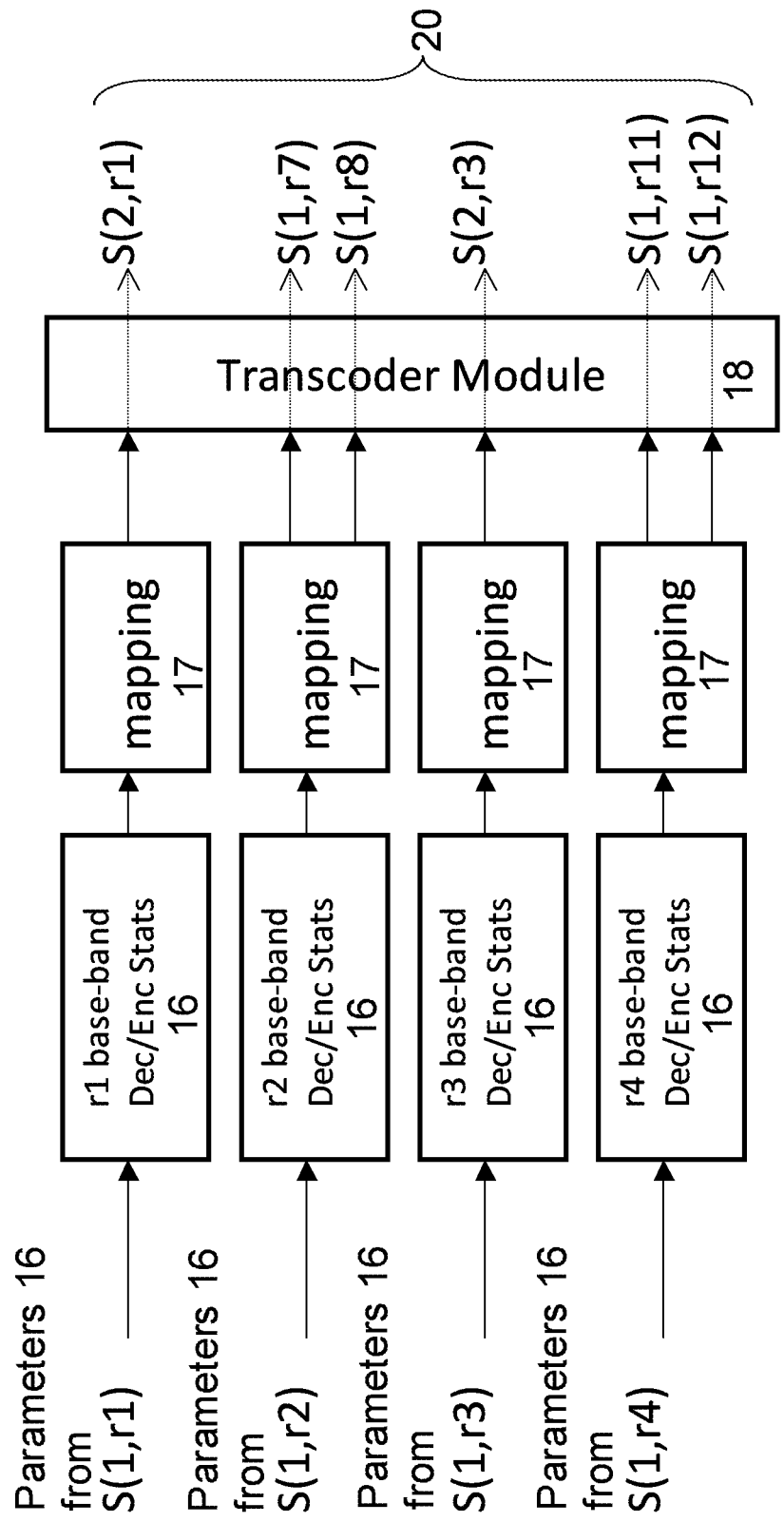
FIG. 4 shows a block diagram of an example embodiment of a high-density quality-adaptive mode of operation of a transcoder system in accordance with the present invention.

FIG. 4 shows another example embodiment where quality adaptation is achieved in a high density transcoding system. Quality-adaptation is achieved by selecting a pool of streams for single-pass processing and another pool for multi-pass processing. Again, for example, the transcoder module 12 outputs N=4 streams 14. Each of the streams may have parameters 16 associated therewith (e.g., parameters 16 for each of the N output streams S(1, r1), S(1, r2), S(1, r3), and S(1, r4) with respective resolutions r1, r2, r3, r4). Output streams S(2, r1) and S(2, r3) are encoded in a 2-pass mode as described in connection with the procedure of FIG. 2 discussed above. The other output streams 20 may be encoded as described above in connection with the procedure of FIG. 3 discussed above.

An optimum N output stream 14 for use as a seed stream may be determined from the N output streams 14 by correlating a number of bits per macroblock of the selected group member and a number of bits per macroblock of each of the N output streams 14. At least one of the seed stream, base-band statistics 62 from a decoded version of the seed stream, or the parameters 16 from the seed stream may be provided to the second transcoder module 18 for use in producing the M output streams 20 of the corresponding group.

For each of the N output streams 14 that does not meet a minimum criteria during the correlating, at least one of each such N output stream 14, base-band statistics 62 from a decoded version of each such N output stream, or parameters 16 from each such N output stream, may be provided to the second transcoder module 18 for producing an enhanced version of each of such N output streams 14 as a corresponding one of the M output streams 20. For example, if there are any M output streams 20 which are weakly correlated to all members of the N output streams 14 (i.e., does not meet specified criteria), the weakly correlated stream can be transcoded twice with transcoder modules 12 and 18 in that order. Since transcoder module 12 already has decoded the stream to base-band, this base-band stream, with a full set of base-band statistics 62 and compression statistics 64, can be fed to second transcoder module 18 for producing an output stream with better video quality. As a further example, prior to starting the transcoder system, two weakly correlated (or odd) streams are located in the M output streams 20. It can be decided to eliminate 2 streams (different from the odd streams) from the N output streams 14 from the first transcoder 12, and bump the 2 odd streams to the first transcoder module 12. In this mode (N−2) unique streams are processed in one pass by the first transcoder module 12, and 2 (odd) streams are processed with 2 passes (with the first and second transcoder modules 12, 18 respectively), and another (M−2) unique but "enhanced" streams are produced from the second transcoder module 18. Hence, (M+N−2) unique streams are transcoded. In this mode we have achieved one way of quality adaptation in the sense that two out of (M+N−2) streams have the highest Video Quality.

At least one of the N output streams 14 may be provided to the second transcoder module 18 to produce enhanced versions of the at least one N output streams 14 as a corresponding at least one of the M output streams 20.

A correlation condition may be determined between the N output streams 14 and the desired M output streams 20. The parameters 16 from the N output streams 14 may be mapped for use in the transcoding of the input stream at the second transcoder module 18 to produce the M output streams 20 based on the determined correlation condition.

Figure 5:
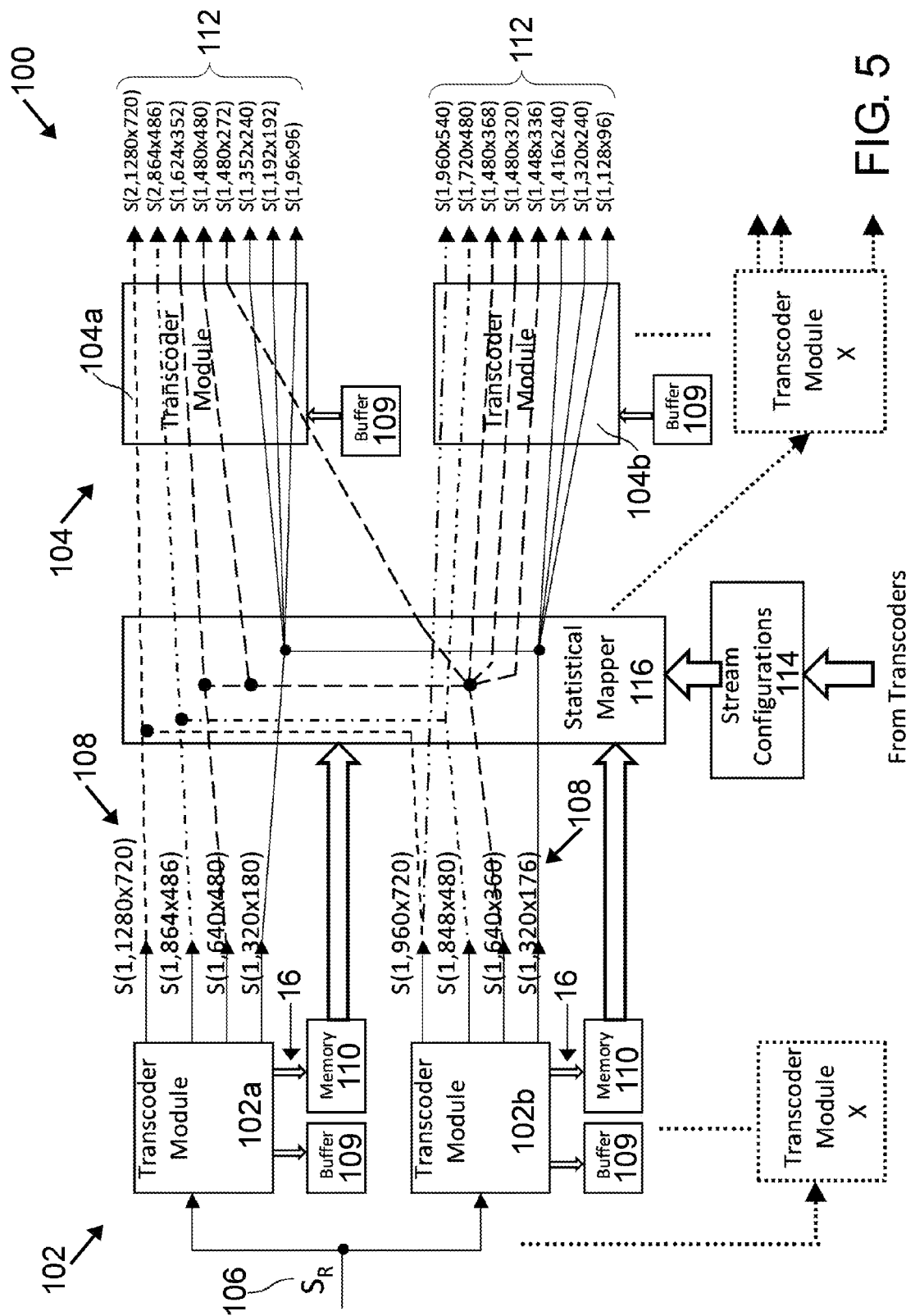
FIG. 5 shows a block diagram of a further example embodiment of a transcoder system in accordance with the present invention.

In a further example embodiment of the present invention, as shown, for example in FIG. 5, a transcoding system 100 for optimizing video quality is provided. A first set of parallel transcoder modules 102a, 102b, . . . 102x (referred to collectively as "first set of parallel transcoder modules" 102) and a second set of parallel transcoder modules 104a, 104b, . . . 104x (referred to collectively as "second set of parallel transcoder modules" 104) are provided. An identical input stream 106 may be provided to each transcoder module of the first set of parallel transcoder modules 102 to provide Y output streams 108. Parameters 16 may be determined (as discussed above in connection with FIGS. 1-4) and stored in a memory 110. The Y output streams 108 and the parameters 16 may be provided to the second set of parallel transcoder modules 104 to produce X output streams 112. The parameters 16 received from the first set of parallel transcoder modules 102 may be used to enhance the transcoding at the second set of parallel transcoder modules 104. The buffers 109 and memories 110 may perform similar functions to those described above with respect to the buffer 22 and the memory 24 of FIG. 1.

Further, it should be appreciated that the first set of parallel transcoder modules 102 may be configured to operate as discussed above in connection with the FIG. 1 embodiment, and that multiple parallel transcoder modules may be provided, each feeding the next for improved quality and/or increased density.

The Y output streams 108 may be partitioned into a plurality of groups based on a correlation of macroblock resolutions of the Y output streams 108. Each group of the Y output streams 108 and the parameters 16 corresponding to the particular group may be provided to a corresponding transcoder module of the second set of parallel transcoder modules 104 based on a correlation of the macroblock resolutions of the group of the Y output streams 108 and the desired macroblock resolution of the X output streams 112 to be produced by the corresponding transcoder module of the second set of transcoder modules 104.

The correlation of the macroblock resolutions of the Y output streams 108 for the partitioning may further comprise comparing a ratio of macroblocks of the Y output streams 108.

A seed stream may be selected from the Y output streams 108 of each group that has a desired resolution. The parameters 16 from the seed stream may be used to enhance the transcoding process at at least one of the transcoder modules of the second set of parallel transcoder modules 104. The desired resolution may be one of the largest resolution in the group, or a centroid of all resolutions in the group.

Each group may be partitioned into sub-groups based on a correlation of the bits per macroblock for each of Y output streams 108. A seed stream may be selected from the Y output streams 108 of each sub-group that has a desired resolution. The parameters 16 from the seed stream may be used to enhance the transcoding process at at least one of the transcoder modules of the second set of parallel transcoder modules 104. The desired resolution may be one of the largest resolution in the sub-group, or a centroid of all resolutions in the sub-group.

It may be determined whether any of the Y output streams 108 is of a lower quality or has a weak macroblock correlation to other of the Y output streams 108. Any such Y output streams 108 may be transcoded at least two times using a subset of the transcoder modules of the second set of parallel transcoder modules 104.

The input stream or a seed stream chosen from the Y output streams 108 that has a desired resolution may be transcoded at least two times using a subset of the transcoder modules of the second set of parallel transcoder modules 104. For example, the seed stream may be transcoded more times than an output stream that is not associated with the target resolution. Further, an output stream 108 that is not associated with the target resolution may be transcoded only once.

Parameters 16 from a first transcoder module (e.g., transcoder module 102a) of the first set of parallel transcoder modules 102 may be provided to at least one other transcoder module (e.g., transcoder module 102b) of the first set of parallel transcoder modules 102 for use in enhancing the transcoding of the input stream.

In particular, FIG. 5 shows, for example, how two sets of parallel transcoder modules 102 and 104 are configured in accordance with an example embodiment of the present invention to output a large number of output streams 108 and 112. As described above, input stream 106 is provided to the first set of parallel transcoder modules 102a, 102b, which output Y output streams 108. The first set of parallel transcoder modules 102a, 102b, may output I and J number of streams respectively, where I+J=Y. For example, transcoder modules 102a, 102b of the first set of parallel transcoder modules 102 output I streams represented by $S(1,r_i)$, and J streams represented by $S(1,r_j)$, respectively. Transcoder modules 104a, 104b of the second set of parallel transcoder modules 104 may output M and Q streams, respectively, where M+Q=X streams 112. Outputs of transcoder modules 104a, 104b may be represented by $S(1,r_m)$ and $S(1,r_q)$, respectively. All configuration parameters 16, including picture resolutions, frame rates, bit-rates, and the like, may be stored in a stream configurations memory 114 as well as in buffers 110. During encoding of streams $S(1,r_i)$ and $S(1,r_j)$, a complete set of base-band statistics 62 and encoder statistics 64 may be stored in memory 110 for resolutions $r_i$ and $r_j$.

A statistical mapper 116 may be provided. The statistical mapper 116 may be designed to examine statistical correlations between resolutions $r_m$ and $r_q$ from the second set of parallel transcoder modules 104 and the resolutions $r_i$ and $r_j$ from the first set of parallel transcoder modules 102. Then the closest match to resolution $r_m$ may be found from macroblock ratios in equations 2.1 and 2.2, shown below:

$$\min_{1 \le i \le I} \left( \max \left( \frac{NMB(r_m)}{NMB(r_i)}, \frac{NMB(r_i)}{NMB(r_m)} \right) \right) \quad \text{eq. 2.1}$$

Likewise, the closest match to $r_q$ may be found from:

$$\min_{1 \le j \le J} \left( \max \left( \frac{NMB(r_q)}{NMB(r_j)}, \frac{NMB(r_j)}{NMB(r_q)} \right) \right) \quad \text{eq. 2.2}$$

Therefore, statistics associated with $r_i$ and $r_j$ resolutions from the first set of parallel transcoder modules 102 may be used to encode streams $S(1, r_m)$ and $S(1,r_q)$, respectively. It may also be possible to find more than one resolution to match the candidate output stream. This may be possible by having streams which are close in terms of width and height but run at different bit-rates. In this example, one or more streams may be used to enhance the encoding quality of streams $S(1, r_m)$ and $S(1,r_q)$. For example, as shown in FIG. 5, stream $S(1,480\times368)$ from the second transcoder module 104b of the second set of parallel transcoder modules 104 with resolution $r_q=480\times368$ may have matches in $S(1,640\times480)$ and $S(1, 640\times360)$ from the first transcoder module 102a of the first set of parallel transcoder modules 102, and from the first transcoder module 104a of the second set of parallel transcoder modules 104, respectively. The statistical mapper 116 may blend statistics from $S(1,640\times480)$ and $S(1,640\times 360)$, and send it to an encoder engine (not shown) dedicated to $S(1,480\times368)$.

If during cross correlation of resolutions, the statistical mapper 116 finds a macroblock ratio $\beta(r_m,r_i)$ which is the best match, but larger than $\theta_r$, the statistical mapper 116 may use an algorithm to decide to perform a two pass encoding task on this particular stream. If a two pass encoding task is performed, the first set of parallel transcoder modules 102 are repartitioned, and the "odd" resolution stream is processed twice by two sets of transcoder modules. Ratio $\beta(r_m,r_i)$ can indicate how weakly or strongly the statistics are correlated between two streams.

$$\beta(r_m, r_i) = \max \left( \frac{NMB(r_m)}{NMB(r_i)}, \frac{NMB(r_i)}{NMB(r_m)} \right) \quad \text{eq. 3.1}$$

$$\begin{cases} \text{if } \beta(r_m, r_i) > \theta_r & \Rightarrow \text{use two-pass} \\ \text{else} & \Rightarrow \text{use one-pass} \end{cases} \quad \text{eq. 3.2}$$

Likewise, $$\begin{cases} \text{if } \beta(r_q, r_j) > \theta_r & \Rightarrow \text{use two-pass} \\ \text{else} & \Rightarrow \text{use one-pass} \end{cases} \quad \text{eq. 3.3}$$

Typically, a $\theta_r$ ratio larger than 2.0 indicates a weak correlation between streams.

Additionally, some of the larger output resolutions may be tagged as high priority streams and processed in a two-pass mode. For example, FIG. 5 also shows an example of how the statistical mapper 116 can group streams together. Stream $S(1,1280\times720)$ being of the highest resolution shown is processed two times with the first transcoder modules 102a, 104a of the first and second set of parallel transcoder modules 102, 104, respectively. Stream $S(1,960\times720)$ can use the statistics from $S(1,1280\times720)$ for encoding, as labeled by the line represented by a dashed line ( - - - ). Additionally, resolution 864×486 may also be tagged as another important stream for two pass encoding. As indicated by a dashed and dotted line (- •- •) the statistics from $S(1,864\times486)$ are used to feed other streams. A long-dashed line (- -) shows a multitude of streams processed by the first transcoder module 104a of the second set of parallel transcoder modules 104 that receive statistical feeds from $S(1,640\times480)$ and $S(1,640\times360)$. A solid line maps base-band statistics 62 and encoder statistics 64 for the smallest group of resolutions shown. A line having a long dash followed by two dots (-••- ••) maps to output stream $S(960\times540)$. Stream $S(960\times540)$ is strongly correlated to streams $S(864\times486)$, $S(848\times480)$ and $S(960\times720)$ in that order. All of the statistics from these streams (or only a selected subset) may be mixed to feed the transcoding of stream $S(960\times540)$. In the FIG. 5 example, since the width "W=960" is not changed between stream $S(960\times540)$ and stream $S(960\times720)$ and correlation is below 2.0 (~1.33) the statistics from stream $S(960\times720)$ may be used.

The Y output streams 108 from the first set of parallel transcoder modules 102 may become the seed streams (also referred to herein as "seeds") for transferring stream information to any X output stream 112 created by the second set of parallel transcoder modules 104. As can be seen in FIG. 5, statistical mapping among transcoded streams may be extended to X number of transcoder modules.

The statistical mapper 116 may be expanded to include consideration of encoding bit-rate "R" in (bits/sec), and frame rate "F" in (frames/sec). For example, output streams $S(1, r_m)$ and $S(1,r_q)$ that satisfy the $\theta_r$ ratio criteria, may form a new sub-group if their target rates maintain the same relationship with the bit-rates of their seed. To accomplish this, bits per macroblock $BPM(r_i)$ are derived for stream resolution $r_i$ from bit-rate $R(r_i)$ and frame rate $F(r_i)$:

$$BPM(r_i) = \frac{R(r_i)}{F(r_i) \times NMB(r_i)} \quad \text{eq. 4}$$

If several seeds exist for an output stream of resolution $r_m$ then the seed i which satisfies the below equation has the highest quality statistics from which transcoding parameters for stream $S(i,r_m)$ can be derived:

$$\frac{|BPM(r_i) - BPM(r_m)|}{BPM(r_m)} \le \omega \quad \text{eq. 5}$$

A nominal value for parameter is 12%.

The present invention also may provide an efficient method for assigning a stream from a set of given Y streams to X dedicated transcoder modules. The motivation is to maximize the overall video quality of the multi-stream transcoding system. The statistical mapper 116 may sort through Y streams and with the aid of equations 2.1 and 2.2, and create G groups of streams. Members of each group may be closely correlated within the group in terms of macroblock resolutions. From each group $G_i$ a stream with a seed resolution may be selected, and defined by $se_i$. The seed resolution can be the largest resolution in a group or can be the centroid of the group. All streams with seed resolutions may be transcoded in a two-pass mode across two transcoder modules, where two transcoder modules is a small fraction of the X transcoder modules. If during the sorting procedure, an "odd" resolution that falls in the two-pass criteria of equation 3.2 and 3.3 is found, this "odd" resolution may be grouped with the seed resolution for the two-pass transcoding mode.

The group $G_i$ may be further divided into sub-groups defined by $g_{i,j}$ using the condition described by equation 5. Hence, more seeds $se_{i,j}$ can be identified to optimize the video quality of the system.

It should now be appreciated that the present invention provides advantageous methods and apparatus for creating numerous high-quality output streams at different spatial or temporal resolutions from a single input stream.

Although the invention has been described in connection with various illustrated embodiments, numerous modifications and adaptations may be made thereto without departing from the spirit and scope of the invention as set forth in the claims.

What is claimed is:

1. A method for transcoding video streams, comprising:
   transcoding an input stream at a first transcoder module to provide N output streams, wherein each of the N output streams comprises different versions of the input stream;
   providing parameters obtained during transcoding of the input stream to a second transcoder module together with the input stream; and
   transcoding the input stream at the second transcoder module to produce M output streams based on the parameters received from the first transcoder module;
   wherein the parameters received from the first transcoder module are used to enhance the transcoding at the second transcoder module.

2. A method in accordance with claim 1, wherein the transcoding of the input stream at the first transcoder module further comprises:
   at least partially decoding the input stream at the first transcoder module.

3. A method in accordance with claim 2, further comprising:
   at least one of storing the input stream in a stream buffer and storing the at least partially decoded input stream in a frame buffer; and
   storing the parameters in a memory.

4. A method in accordance with claim 2, wherein the parameters are provided by:
   extracting statistical parameters during at least partial decoding of the input stream.

5. A method in accordance with claim 2, wherein transcoding the input stream at the first transcoder module further comprises:
   re-encoding the at least partially decoded input stream to produce the N output streams;
   wherein each of the N-output streams is obtained by re-encoding the input stream at one or more different resolutions and/or in one or more different encoding formats.

6. A method in accordance with claim 5, wherein the parameters comprise statistical parameters obtained during the at least partial decoding or the re-encoding of the input stream.

7. A method in accordance with claim 2, wherein the parameters are obtained from at least one of the input stream, the at least partially decoded input stream, and the N output streams.

8. A method in accordance with claim 7, wherein the N output streams are in a compressed domain.

9. A method in accordance with claim 1, wherein the parameters comprise respective parameters for each of the N output streams.

10. A method in accordance with claim 1, wherein the parameters comprise at least one of picture bits, picture quantization factors, motion information, mode decision histograms, spatial activities, temporal activities, resolution histograms, picture distortion, picture type frequencies, structural similarities, grey-level histograms, and picture sample dynamic range.

11. A method in accordance with claim 1, wherein:
   a first subset of the M output streams has identical transcoding attributes as a corresponding subset of the N output streams;
   a second subset of the M output streams has different transcoding attributes from any of the N output streams;
   the transcoding attributes comprise at least one of resolution, bit-rate, frame-rate, stream format, and picture type assignment.

12. A method in accordance with claim 1, further comprising:
   mapping the parameters from any one of N output streams for use in producing a desired one of the M output streams.

13. A method in accordance with claim 12, wherein the mapping of the parameters comprises correlating a plurality of macroblock resolutions of the one N output stream to the desired M output stream.

14. A method in accordance with claim 13, wherein correlating the macroblock resolutions further comprises comparing a ratio of a number of macroblocks between the one N output stream and the desired M output stream.

15. A method for transcoding video streams, comprising:
   transcoding an input stream at a first transcoder module to provide N output streams, wherein each of the N output streams comprises different versions of the input stream;
   providing parameters obtained during transcoding of the input stream to a second transcoder module together with the input stream;
   transcoding the input stream at the second transcoder module to produce M output streams based on the parameters received from the first transcoder module; and
   grouping desired M output streams into two or more groups by correlating a macroblock resolution of a selected group member of each group of the desired M output streams with a closest macroblock resolution of at least one of the N output streams;
   wherein the parameters received from the first transcoder module are used to enhance the transcoding at the second transcoder module.

16. A method in accordance with claim 15, wherein:
   the at least one N output stream comprises at least one seed stream for the corresponding group of M output streams;

the at least one seed stream, base-band statistics from a decoded version of the at least one seed stream, or the parameters from the at least one seed stream are provided to the second transcoder module for use in producing the M output streams of the corresponding group.

17. A method in accordance with claim 15, further comprising:
creating sub-groups in each group of M output streams by correlating a number of bits per macroblock from the desired M output streams with a number of bits per macroblock from the N output streams.

18. A method in accordance with claim 15, further comprising:
determining an optimum N output stream for use as a seed stream from the N output streams by correlating a number of bits per macroblock of the selected group member and a number of bits per macroblock of each of the N output streams; and
at least one of the seed stream, base-band statistics from a decoded version of the seed stream, or the parameters from the seed stream are provided to the second transcoder module for use in producing the M output streams of the corresponding group.

19. A method in accordance with claim 18, further comprising:
for each of the N output streams that does not meet minimum criteria during the correlating, providing at least one of each such N output stream, base-band statistics from a decoded version of each such N output stream, or parameters from each such N output stream to the second transcoder module for producing an enhanced version of each of such N output streams as a corresponding one of the M output streams.

20. A method in accordance with claim 1, further comprising:
providing at least one of the N output streams to the second transcoder module to produce enhanced versions of the at least one N output streams as a corresponding at least one of the M output streams.

21. A method in accordance with claim 1, further comprising:
determining a correlation condition between the N output streams and the desired M output streams;
mapping the parameters from the N output streams for use in the transcoding of the input stream at the second transcoder module to produce the M output streams based on the determined correlation condition.

22. A method for optimizing video quality in a transcoder system, comprising:
providing a first set of parallel transcoder modules;
providing a second set of parallel transcoder modules;
providing an identical input stream to the first set of parallel transcoder modules to provide Y output streams;
determining parameters from the transcoding of the input stream;
providing the Y output streams and the parameters to the second set of parallel transcoder modules to produce X output streams;
wherein the parameters received from the first set of parallel transcoder modules are used to enhance the transcoding at the second set of parallel transcoder modules.

23. A method in accordance with claim 22, further comprising:
partitioning the Y output streams into a plurality of groups based on a correlation of macroblock resolutions of the Y output streams.

24. A method in accordance with claim 23, further comprising:
providing each group of the Y output streams and the parameters corresponding to the particular group to a corresponding transcoder module of the second set of parallel transcoder modules based on a correlation of the macroblock resolutions of the group of the Y output streams and the desired macroblock resolution of the X output streams to be produced by the corresponding transcoder module of the second set of transcoder modules.

25. A method in accordance with claim 23, wherein the correlation of the macroblock resolutions of the Y output streams for the partitioning further comprises, comparing a ratio of macroblocks of the Y output streams.

26. A method in accordance with claim 23, further comprising:
selecting a seed stream from the Y output streams of each group that has a desired resolution;
using the parameters from the seed stream to enhance the transcoding process at least one of the transcoder modules of the second set of transcoder modules.

27. A method in accordance with claim 26, wherein the desired resolution is one of:
the largest resolution in the group, or
a centroid of all resolutions in the group.

28. A method in accordance with claim 23, further comprising:
partitioning each group into sub-groups based on a correlation of the bits per macroblock for each of Y output streams.

29. A method in accordance with claim 28, further comprising:
selecting a seed stream from the Y output streams of each sub-group that has a desired resolution;
using the parameters from the seed stream to enhance the transcoding process at least one of the transcoder modules of the second set of transcoder modules.

30. A method in accordance with claim 29, wherein the desired resolution is one of:
the largest resolution in the sub-group, or
a centroid of all resolutions in the sub-group.

31. A method in accordance with claim 22, further comprising:
determining whether any of the Y output streams is of a lower quality or has a weak macroblock correlation to other of the Y output streams;
transcoding any such Y output streams at least two times using a subset of the transcoder modules of the second set of parallel transcoder modules.

32. A method in accordance with claim 22, further comprising:
transcoding the input stream or a seed stream chosen from the Y output streams that has a desired resolution at least two times using a subset of the transcoder modules of the second set of parallel transcoder modules.

33. A method in accordance with claim 32, further comprising:
transcoding the seed stream more times than an output stream that is not associated with the target resolution.

34. A method in accordance with claim 32, further comprising:
transcoding an output stream that is not associated with the target resolution once.

35. A method in accordance with claim 22, wherein:
parameters from a first transcoder module of the first set of parallel transcoder modules are provided to at least one other transcoder module of the first set of parallel transcoder modules for use in enhancing the transcoding of the input stream.

36. A system for transcoding video streams, comprising:

at least a first transcoder module and a second transcoder module; wherein:

the first transcoder module is adapted to transcode an input stream to provide N output streams, wherein each output stream comprises a different version of the input stream;

the second transcoder module is adapted to receive the input stream and parameters obtained during transcoding of the input stream at the first transcoder module; and the second transcoder module is adapted to transcode the input stream to produce M output streams based on the received parameters.

* * * * *